United States Patent Office 2,796,185
Patented June 18, 1957

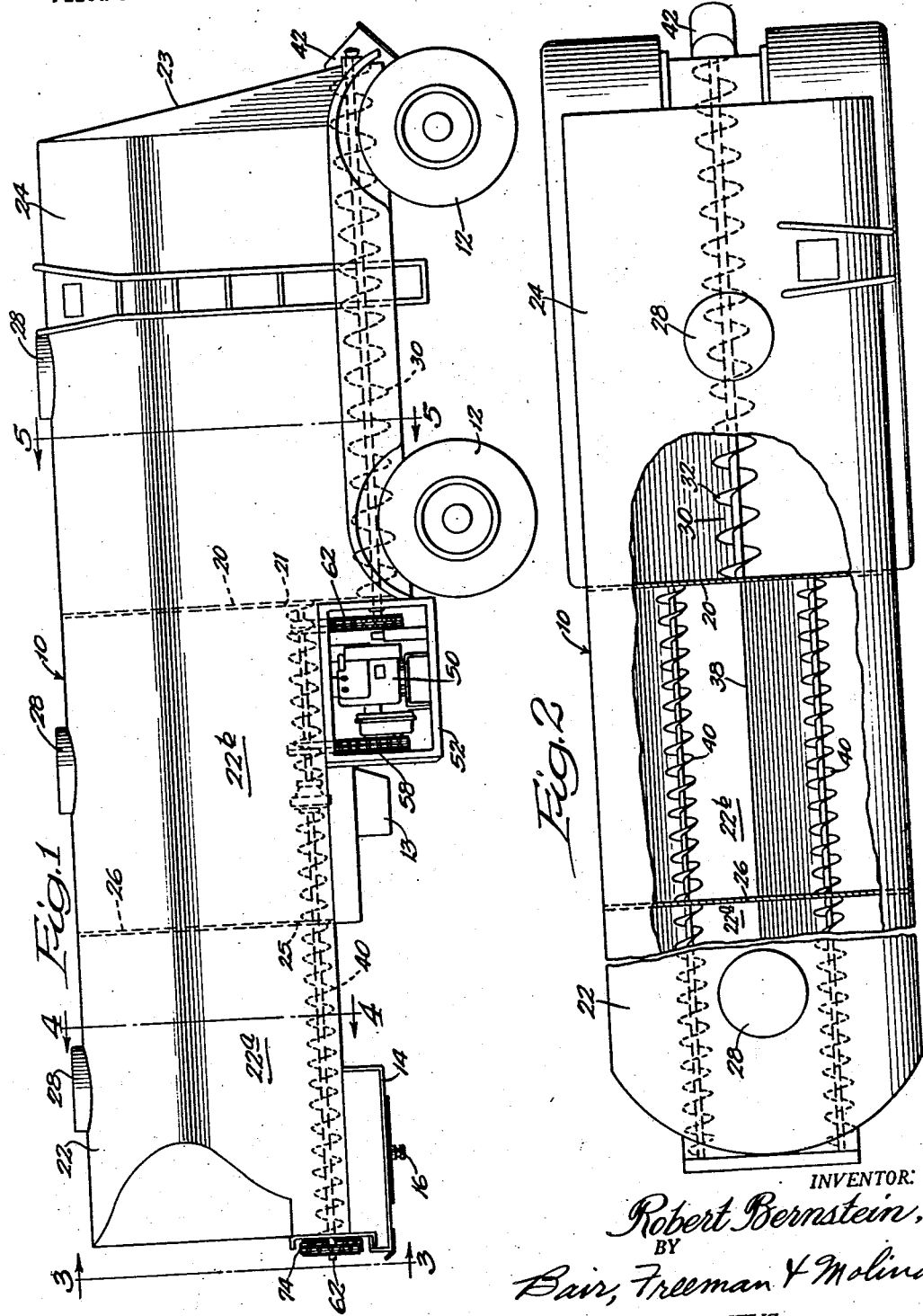

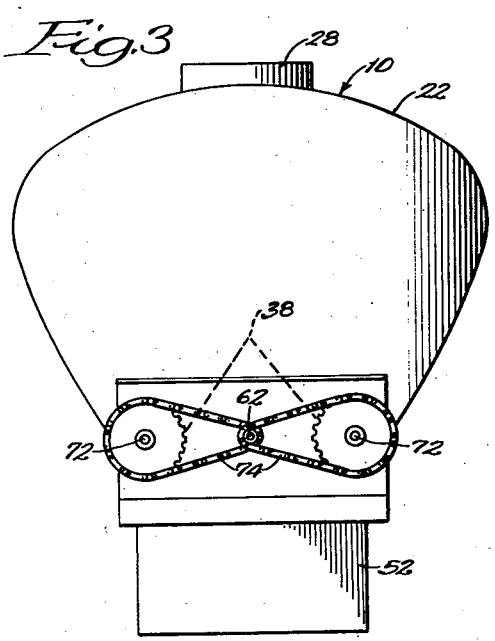
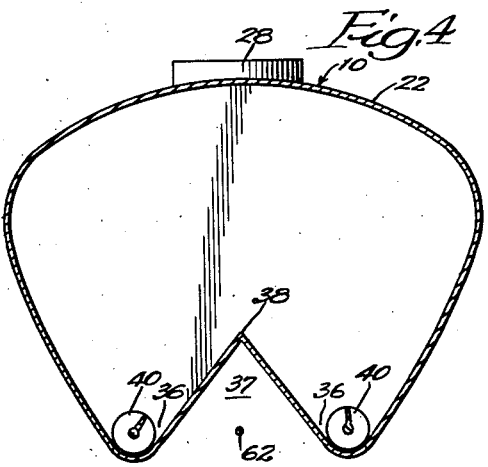
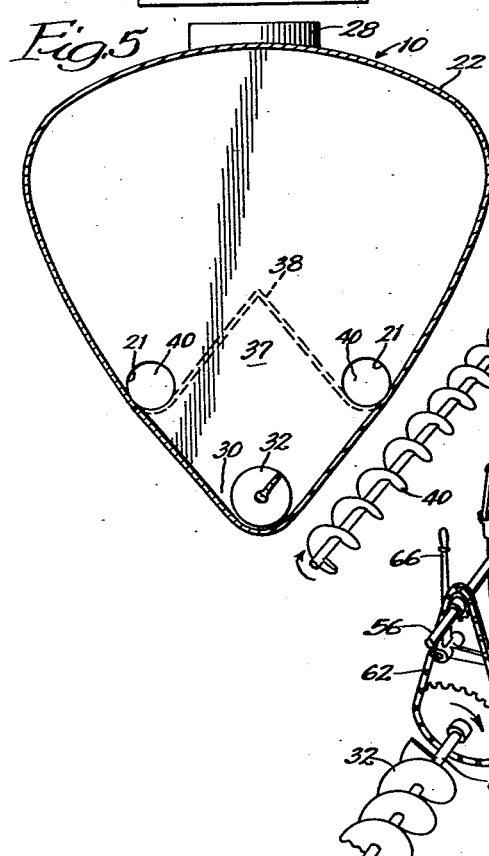
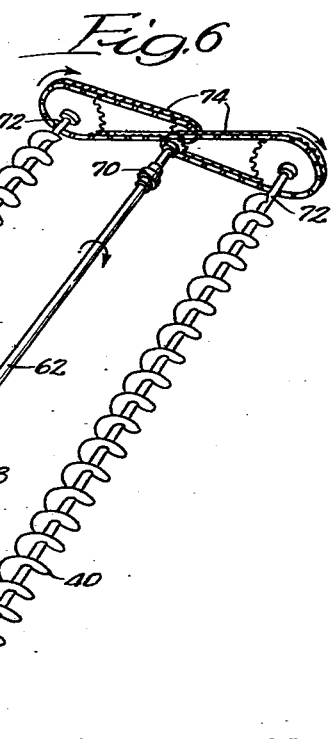

2,796,185

MATERIAL HANDLING SYSTEM FOR TANK-TYPE VEHICLES

Robert Bernstein, Omaha, Nebr., assignor to Fruehauf Trailer Company, Detroit, Mich., a corporation of Michigan Application February 8, 1955, Serial No. 486,789

3 Claims. (Cl. 214—519)

This invention relates to semi-trailers of the tank type adapted to transport solid granular or powdered materials in bulk form, as for example, Portland cement, grains, carbon black, and the like. Mounted within the tank is a conveyor system for discharging the bulk material from the rear end of the tank. Tanks of this type made previously have a generally V-shaped cross section throughout their length and are equipped with a single feed screw in the bottom thereof for discharging material from the tank. The side walls slope at an angle of from 30° to 45° from the vertical, depending upon the flow characteristics of the bulk material being handled, to insure gravity flow to the screw. It will be apparent that as the angle between the side walls and a vertical plane increases to provide this flow to the screw, the volume of the tank is decreased. If the slope is too flat, the solid material will not flow. Since it is not practical to increase the height of trailers which must travel on highways having viaducts and the like, it has been necessary to tolerate a limited capacity for the advantage offered in an efficient conveyor system.

The present invention permits increasing the volume of the trailer tank without increasing its height or adversely affecting the flow of all of the bulk material to the conveyor in the bottom of the tank. This is accomplished by increasing the width of the tank, lowering the floor of the rear section located over the wheels, and providing two parallel longitudinal troughs instead of one in the floor of the shallow forward section above the hitch. In this way the width of the forward section may be equal to that of the rear section without reducing the slope of the side walls. It will be apparent that the floor of the forward section must be raised to provide clearance for the tractor hitch and vertical support. The rear section, of course, is not so restricted.

The tank trailer of the invention is divided into two compartments by means of a vertical bulkhead extending transversely thereof. The shallow forward compartment has convexly-curved side walls joining a floor which defines the pair of longitudinal troughs just mentioned. The configuration of the floor of the forward compartment resembles a W in cross section. The rear compartment has convexly-curved side walls which are co-extensive with those of the forward compartment, but continue to slope downwardly past the floor of the forward compartment until they meet to form a single trough between the wheels of the trailer, a substantial distance below said floor. Each of the three troughs has a feed screw for moving material to the rear of the tank. Openings are provided in the vertical bulkhead adjacent the ends of the pair of screw conveyors in the forward compartment for permitting the bulk material to be discharged into the rearward compartment, and thence out the end of the tractor.

An important feature of this invention lies in the arrangement of the drive means and the power means for the screw conveyors. The drive shaft for the pair of screw conveyors in the forward compartment is disposed outside the tank within the inverted V-shaped rib between the parallel troughs and projects beyond the forward end of the tank, at which end a coupling connection to the twin screw shafts is effected. The power means is mounted directly below the forward compartment just forward of the bulkhead, for adequate road clearance. The power means is coupled to the single larger diameter screw in the rear compartment and is adapted for driving the pair of screw conveyors in the forward compartment only when the conveyor in the rear compartment is in operation. In this way the material in the rear compartment is discharged first, and there is no possibility of discharging thereinto when it is full.

It is, therefore, an object of this invention to provide an improved tank-type trailer having increased capacity and uniform overall width without increasing the height, and which is easily and effectively emptied by means of power conveyors mounted therein.

Another object of the invention is to provide a tank construction of this kind in which the driving mechanism and the source of power are nested with the tank bottom, completely accessible from outside the tank, and thoroughly protected from the contents of the tank.

These and other objects will become apparent from the following description taken in conjunction with the accompanying drawing, in which:

Figure 1 is a side view of a semi-trailer constructed in accordance with the invention;

Figure 2 is a plan view of the trailer with the top partially broken away to show the conveyor screws and troughs in the bottom of the tank;

Figure 3 is a cross-sectional view taken along the line 3—3 of Figure 1;

Figure 4 is a cross-sectional view taken along the line 4—4 of Figure 1;

Figure 5 is a cross-sectional view taken along the line 5—5 of Figure 1; and

Figure 6 is a perspective semi-diagrammatic view of the drive mechanism for the conveyor system employed for discharging materials from the tank.

The vehicle shown in the drawing, for purposes of illustration only, comprises an elongated tank, indicated generally by the numeral 10, which is mounted on a chassis supported conventionally at the rear end by four wheels 12. The section of the tank ahead of the wheels is necessarily shallower than the rear section to accommodate the hitch mechanism 14 including the king pin 16 for securing the semi-trailer to the tractor. A fifth wheel or suitable vertical support housed in the compartment 13 is provided to support the front end of the tank when it is not hitched to a tractor.

The tank 10 is transversely divided into two compartments by a vertical bulkhead 20 just forward of the front wheels, thus forming a forward compartment 22 and a rearward compartment 24. The forward compartment 22 is further divided into two sections 22a and 22b by means of a second vertical bulkhead 26. Access to each of the compartments 22a, 22b and 24 is provided through covered access openings 28 in the top of the tank. The tank is compartmentized so that it may be loaded to provide equal distribution of weight on the wheels, which, of course, is necessary to comply with state trucking regulations.

The tank is more or less heart-shaped in section, as shown in section, as shown in Figure 5, having a domed top and convexly-curved side walls. The rearward compartment 24 terminates at the bottom in a V-shaped trough 30 formed by the junction of the downwardly sloping side walls. The trough 30 has an arcuate bottom adapted to accommodate a feed screw or conveyor 32 disposed therein for advancing bulk material in said compartment to the rear end of the tank. The screw is suitably mounted on bearings (not shown) fixed to the vertical members of the tank. The forward compartment 22 is of different cross-sectional configuration at the bottom in order to provide a maximum volume within the restricted vertical dimension. This is accomplished by providing a bottom defining two parallel longitudinal troughs 36 formed by the junction of the side walls with an intermediate inverted V-shaped rib 38 extending centrally along the entire length of the compartment 22. This structure is best illustrated in Figures 2 and 4. It will be noted that the cross-sectional shape of the floor of compartment 22 resembles the letter W. To unload the tank screw conveyors 40 are disposed within the troughs 36 for advancing material in the forward compartment 22 rearwardly through openings 21 in the bulkhead 20 and into the rear compartment 24. The screws 40 are of smaller diameter than the screw 32 in the trough in the bottom of compartment 24 since there are two of them supplying the single feed screw 32. The capacity of the twin screws 40 and the single screw 32 should be approximately equal.

The side walls of the compartments 22 and 24 are coextensive and differ in shape and in dimension only in the lower floor section. Thus, the top and sides of the tank are uniform in cross section throughout its entire length. The advantage in employing a single trough bottom in the rear compartment together with a double trough bottom in the forward compartment is emphasized by considering what would occur if a single trough were used in the forward compartment. In such case, in order to insure complete delivery by gravity of all of the material in the compartment to the trough, the side walls would have to slope inwardly from a point much closer to the top of the tank in order to terminate within the limited height dimension. Because it is desirable that the width of the tank compartments be the same, a loss in capacity results.

As best shown in Figure 5, the side walls of the rear compartment 24 extend downwardly some substantial distance below the floor of the forward compartment to form the trough 30. The difference in height between the floors of the two compartments will range between 18 and 24 inches. The cross-sectional shape of the compartment 24 takes advantage of the fact that the rear compartment may be deeper than the forward compartment because it is not necessary to provide clearance for the accommodation of the tractor hitch. On the other hand, the bottom of the tank must be narrower in order to accommodate the wheels 12. Thus, the combination of the W-shaped bottom for the forward compartment and the V-shaped bottom for the rearward compartment complement each other perfectly to provide maximum volume.

The bulkhead 26 contains a pair of openings 25 near the bottom to accommodate the twin screws 40. The bulkhead 20 has a pair of openings 21 aligned with the screws 40 to permit discharge of bulk material through the bulkhead into the rearward compartment 24. The rear wall 23 of the tank has a discharge opening aligned with the screw 32 which connects to a discharge hopper 42 for directing flow of material being moved from the tank by the conveyor system. The hopper 42 may be provided with a suitable conveyor.

Referring now to the mechanism for driving the screw conveyors, best shown in Figures 1 and 6, the power source such as a gasoline engine 50 is mounted within a cabinet 52 secured to the underside of the compartment 22 immediately forward of the bulkhead 20. It will be noted that the upper part of the engine nests into the space 37 between the troughs 36 of the floor of the forward compartment so that adequate clearance is provided above the roadbed. Suitable access openings are provided on either side of the cabinet 52, making the engine easily accessible for repairs while protecting it from water, mud and other materials that might be splashed up from the road. The engine shaft 54, which may be connected to the crankshaft of the engine through a suitable clutch arrangement (not shown), is connected to the driving shaft 56 through a couple of sprockets and a chain 58. All of the sprocket and chain couplings shown in the drawing are of the double type for heavy duty, but it will be understood that single chain and sprockets may be used if the load requirements are less severe. The driving shaft 56 lies within the space 37 between the troughs 36 and is thus protected by the inverted V-shaped rib 38. The rear end of the driving shaft 56 is coupled by means of a pair of sprockets and chain 62 to the shaft 60 of the screw 32 so that this screw rotates at all times while the engine shaft 54 is turning. The forward end of the driving shaft 56, which extends beyond the chain 58, carries one member of the clutch 64 which serves to couple the driving shaft 56 to the counter shaft 62, which is in axial alignment with the shaft 56. Shaft 62 extends within the space 37 and projects beyond the forward end of the tank. The clutch 64 may be manually operated by actuating the lever 66 which works through a suitable linkage, such as that illustrated in Figure 6, to move the yoke 68 for engaging or disengaging the clutch.

The countershaft 62, which may contain a flexible coupling 70, is adapted to drive the shafts 72 of the screws 40 through sprockets and chains designated by the numeral 74, Figure 3. The shafts 72 extend through the forward end of the tank and the sprockets are mounted outside the tank so that they are accessible for repair and maintenance without going inside the tank. The advantage of this construction is apparent since both the power source and the drive mechanism are located to complement the space 37 provided between the troughs 36 and thus provide adequate road clearance as well as accessibility and protection from the material in the tank. By providing feed screws which extend only about half the length of the tank the load on the screws is markedly reduced, thus reducing the size of the engine required to drive the screws.

In operation, the engine 50 is started and engaged with the driving shaft 56. This causes the screw 60 to rotate, thus advancing bulk granular material in the rear compartment 24 toward the end of the tank and out through the hopper 42. The material in the upper portion of the compartment flows by gravity down the sloping side walls to the trough as the material already in the trough is moved out. Complete removal of substantially all material is provided by this means. After the rear compartment 24 has been emptied, the clutch lever 66 is thrown to engage the clutch 64, hence coupling the driving shaft 56 with the counter shaft 62 which drives the twin screws 40 in the forward compartment. The material in this compartment is advanced by the screws through openings 21 in the bulkhead 20 which material drops into the trough 30 below. Because the screw 32 is considerably larger in diameter than the screws 40, the material discharged into the compartment 24 is removed just as rapidly as it enters. Thus, there is no build up of material in compartment 24. It will be noted that the drive mechanism is arranged so that the screws 40 cannot be operated without operating the screw 32, thus preventing material from being discharged into the compartment 24 without being removed therefrom.

From the foregoing description it is apparent that the invention provides an improved tank trailer of greatly increased capacity and having efficient conveying means for rapidly moving the material from the tank with minimum power consumption.

What I claim as new and desire to secure by Letters Patent of the United States is:

1. In a semi-trailer of the class described, an elongated closed tank divided transversely into a forward and rearward compartment by a vertical bulkhead, said forward compartment having a floor of generally W-shaped cross section defining a pair of longitudinal parallel troughs and having opposed inwardly sloping side walls joining said troughs, said rearward compartment having side walls coextensive with the side walls of said forward compartment which meet to form a single trough below the level of said floor, a pair of screw conveyors disposed in the troughs of said forward compartment and coextensive therewith, a single screw conveyor disposed in said single trough, openings in said bulkhead adjacent the ends of said pair of screws for permitting discharge of solid material from said forward compartment to said rearward compartment, a discharge opening in the rear end of said rearward compartment adjacent the end of the single screw for discharging material from the tank, a countershaft for driving said pair of screws disposed outside said tank within the space between said parallel troughs, a drive shaft for said single screw extending forwardly through said bulkhead, a power source mounted beneath said forward compartment just forward of the bulkhead, means connecting said power source to said drive shaft, and a clutch for coupling said last means to said countershaft to drive said pair of screws only when said single screw is operating.

2. In a semi-trailer of the class described, an elongated closed tank having a domed top and convexly-curved side walls of uniform width, said tank being divided transversely into a forward and rearward compartment by a vertical bulkhead, said forward compartment having a floor of generally W-shaped cross section defining a pair of longitudinal parallel troughs and being divided into two sections by means of a second vertical bulkhead, the side walls comprising the rearward compartment of said tank joining well below said floor to define a single trough, a pair of screw conveyors disposed in the troughs of said forward compartment and coextensive therewith, a single screw conveyor disposed in said single trough, openings in said bulkhead adjacent the ends of said pair of screws for permitting discharge of solid material from said forward compartment to said rearward compartment, and a discharge opening in the rear end of said rearward compartment adjacent the end of the single screw for discharging material from the tank.

3. In a semi-trailer of the class described, an elongated closed tank divided transversely into a forward and rearward compartment by a vertical bulkhead, said forward compartment having a floor of generally W-shaped cross section defining a pair of longitudinal parallel troughs and having opposed inwardly sloping side walls joining said troughs, said rearward compartment having side walls coextensive with the side walls of said forward compartment which meet to form a single trough below the level of said floor, a pair of screw conveyors disposed in the troughs of said forward compartment, a single screw conveyor disposed in said single trough, openings in said bulkhead adjacent the ends of said pair of screws for permitting discharge of solid material from said forward compartment to said rearward compartment, a discharge opening in the rear end of said rearward compartment adjacent the end of the single screw for discharging material from the tank, a countershaft disposed within the space outside said tank between said parallel troughs and extending beyond the forward end of the tank, shafts extending from each of said pair of screws through the forward end of the tank and coupled to said countershaft, a power source mounted beneath said forward compartment just forward of the bulkhead, a drive shaft mounted in axial alignment with said countershaft and driven by the engine, a shaft extending from said single screw through the bulkhead and permanently coupled to said drive shaft, and a clutch for intermittently coupling said countershaft to said drive shaft.

References Cited in the file of this patent

UNITED STATES PATENTS

| 1,915,757 | Pierce | June 27, 1933 |
| 1,915,758 | Pierce | June 27, 1933 |
| 2,190,724 | McBride | Feb. 20, 1940 |
| 2,290,460 | Winsor | July 21, 1942 |
| 2,615,587 | Beyer et al. | Oct. 28, 1952 |
| 2,633,255 | Hoffstetter | Mar. 31, 1953 |
| 2,691,455 | Bailey | Oct. 12, 1954 |

FOREIGN PATENTS

| 138,547 | Australia | Sept. 1, 1950 |